Patented Aug. 29, 1950

2,520,401

UNITED STATES PATENT OFFICE 2,520,401

PRODUCTION OF THIOSULFENAMIDES

Chester M. Himel, Palo Alto, Calif., and Lee O. Edmonds, Bartlesville, Okla., assignors to Phillips Petroleum Company, a corporation of Delaware No Drawing. Application May 12, 1949, Serial No. 92,964

10 Claims. (Cl. 260—293.4)

This invention relates to the production of thiosulfenamides. In a specific aspect this invention relates to the interaction of thiosulfenyl halides and amines to form thiosulfenamides.

In the copending application of one of us, Serial No. 89,475, filed April 25, 1949, a process is described wherein thiosulfenyl halides are reacted with amines to produce the corresponding thiosulfenamides. While the method disclosed in that application has numerous advantages, certain difficulties arise when operating in the manner described therein. The reaction between a thiosulfenyl halide and an amine evolves free halogen acid which in turn reacts with unconverted amine to form an amine hydrohalide with which the thiosulfenyl halide does not react. Thus, for each molecule of thiosulfenamide formed, one molecule of amine is changed to the inactive hydrohalide, and, in order to effect the complete utilization of the thiosulfenyl halide, two mols of amine must be supplied to the reaction for each mol converted to thiosulfenamide. Separation and recovery of the unreacted amine from the reaction effluent involves added equipment and operational costs. Furthermore, when operating in this manner, precipitation of the amine hydrohalide renders the reaction mixture highly viscous and efficient agitation of the system requires excessive expenditure of energy and extreme dilution. Thus, incomplete reaction, local overheating, added solvent recovery costs, and the like, are often encountered.

An object of this invention is to provide an improved method for the production of thiosulfenamides.

Another object of this invention is to provide a method for the production of thiosulfenamides which overcomes the difficulties encountered in the method described in copending application, Serial No. 89,475, filed April 25, 1949.

A further object of this invention is to provide an improved synthesis of thiosulfenamides from thiosulfenyl halides and amines.

Other objects will appear more fully hereinafter.

We have found that by conducting the reaction between a thiosulfenyl halide and an amine in the presence of an aqueous solution of an alkaline material, the aforementioned difficulties are overcome and highly efficient yields of the corresponding thiosulfenamide can be realized. By the method of our invention the halogen acid formed during the reaction is neutralized by the alkaline solution thus permitting complete utilization of the amine in the reaction with the thiosulfenyl halide.

Thiosulfenyl halides are hydrolytically unstable and the failure of any process in which they are brought into contact with an aqueous solution would appear to be obvious. However, we have found that when the thiosulfenyl halide is dissolved in a suitable solvent and contacted with an amine in the presence of an aqueous solution of an alkaline material, the reaction between the thiosulfenyl halide and the amine proceeds preferentially to that between the thiosulfenyl halide and water. The mechanism by which this preferential reaction takes place is not entirely clear, but it may involve a more rapid reaction between thiosulfenyl halide and amine than between thiosulfenyl halide and water.

When operating according to the method of our invention, no excess of amine is required, the reaction proceeding to a high degree of conversion of thiosulfenyl halide and amine when the starting materials are supplied on a mol for mol basis. Thus, laborious separations and purification processes for the recovery of unconverted amine and isolation of high quality product are eliminated. Furthermore, the extremely viscous solutions are avoided, adequate agitation is facilitated, and attendant difficulties are obviated.

The thiosulfenyl halides employed in our process may be alkyl, cycloalkyl, aryl, aralkyl or alkaryl. They may be obtained from any convenient source or they may be prepared as used. An efficient method for producing tertiary alkyl thiosulfenyl halides is described and claimed in copending application, Serial No. 89,475, mentioned above. Specific examples of compounds that may be used in practicing our invention are the following thiosulfenyl halides: ethyl, propyl, isopropyl, n-butyl, isobutyl, tert.-butyl, n-amyl, sec-amyl, tert.-amyl, n-hexyl, sec-hexyl, tert.-hexyl, octyl, decyl, dodecyl, cyclopentyl, cyclohexyl, phenyl, benzyl, 2-phenylethyl, 3-propylphenyl, 2 - methylphenyl, 3 - methylphenyl, 4-methylphenyl, 2-ethylphenyl, 4-isopropylphenyl and 3-butylphenyl. The thiosulfenyl halide should contain no more than 20 carbon atoms per molecule, preferably no more than 12 carbon atoms per molecule. We also use thiosulfenyl halides containing, in addition to sulfur and halogen atoms, only carbon and hydrogen atoms.

The amines employed may be either primary or secondary. The substituents attached to the nitrogen atom of the amine may be the same or different and include alkyl and aralkyl groups. Alkyl-aryl amines are likewise applicable. Examples are methyl aniline, benzylamine, aliphatic amines such as methyl, ethyl, propyl, butyl, and higher amines, diemthyl, diethyl, dipropyl, dibutyl, and higher dialkyl amines, mixed amines such as methyl ethylamine and the like. Heterocyclic amines which are secondary rather than tertiary may also be employed. Thus, morpholine is applicable to our process while pyridine cannot be used. Another heterocyclic amine which may be employed is piperidine. Cycloalkyl amines such as cyclohexyl amine may also be employed.

The thiosulfenyl halide used in practicing the present invention is dissolved in a suitable solvent before contacting with the amine and alkaline solution. The solvent employed for dissolving the thiosulfenyl halide will preferably be a paraffin hydrocarbon such as, for example, isopentane, or a mixture of paraffin hydrocarbons since these materials are readily available at low cost. However, when desired diethyl ether, chloroform, methylene chloride, benzene or other suitable organic solvent which is substantially inert in the reaction may be employed. It is convenient to employ a solvent which boils at a relatively low temperature, say between 25 and 50° C., and to carry out the reaction in the refluxing solvent. By so operating the reaction temperature can be maintained at a convenient level and a certain degree of agitation of the system is automatically provided. If desired mechanical means for agitating the system so as to maintain intimate admixture of the solvent phase and the aqueous phase may be provided. In any case, it is essential that the solvent selected be free from appreciable amounts of sulfur or sulfur compounds, oxygen compounds, nitrogen compounds, unsaturated hydrocarbons, or any other impurities which would objectionably interfere with the reaction or contaminate the product.

The amine employed in practicing the present invention may be either soluble or insoluble in water with equally satisfactory results. One of the advantages of our invention lies in the fact that the amine need not be anhydrous. Since the reaction is effected in the presence of an aqueous solution, amines with which dehydration would be expensive or impractical can be readily employed, thus greatly extending the usefulness of the thiosulfenyl halide and increasing the number of thiosulfenamides readily made available.

Conditions of temperature and pressure for effecting the synthesis of thiosulfenamides by the present process are, in general, not critical. The reaction proceeds smoothly at atmospheric pressure and room temperature. However, when desired, pressures either above or below atmospheric may be employed and temperatures within the range of −20 to 65° C. or even beyond these limits are applicable.

The success of the synthesis reaction is dependent upon the order of addition of reactants. For example, an amine-caustic solution added to an alkyl thiosulfenyl chloride dissolved in a low-boiling paraffinic solvent gives a low yield of the corresponding thiosulfenamide. On the other hand, by reversing the procedure, that is, by adding the alkyl thiosulfenyl chloride solution to the amine-caustic solution, considerably higher yields of thiosulfenamide are realized.

It is preferred to employ substantially equally molar proportions of the thiosulfenyl halide and the amine. For example, the molar ratio of thiosulfenyl halide to the amine preferably ranges from 0.75:1 to 1.25:1. Employment of substantially stoichiometric equivalents of the thiosulfenyl halide and the amine is highly advantageous because it obviates the necessity of recovering large amounts of unreacted thiosulfenyl halide or amine from the reaction mixture and thereby greatly reduces the cost of production of thiosulfenamides.

It is preferred to employ the alkaline material in an amount sufficient to neutralize all of the hydrogen halide formed by the reaction between the thiosulfenyl halide and the amine. The amount of alkaline material required for this purpose would be at least stoichiometrically equivalent to whichever of the thiosulfenyl halide or the amine is present in lesser mol proportion. In other words, if a slight molar excess of the thiosulfenyl halide over the amine is employed, the amount of hydrogen halide liberated by the reaction would be at a maximum not more than that stoichiometrically equivalent to the amine. Generally speaking, we employ equimolar proportions of the thiosulfenyl halide, amine and alkaline material.

The alkaline material employed in the practice of the present invention is preferably sodium hydroxide which is preferred because of its cheapness and ready availability. However, the process of the present invention operates equally well with hydroxides and carbonates of such alkali metals as sodium, potassium, or lithium and with oxides, hydroxides, and carbonates of other metals such as the alkaline earth metals.

The concentration of the alkaline material in the aqueous solution thereof employed in the practice of the present invention may vary over wide limits, but generally ranges from 10 per cent by weight up to 30 per cent by weight. However, concentrations outside of this range may be employed if desired.

The process of the present invention is usually carried out in the following manner. A solution of the thiosulfenyl halide in the inert organic solvent which is capable of forming a separate phase in the reaction mixture and which preferably boils between 25 and 50° C. is commingled with the amine and with the aqueous solution of the alkaline material. The resulting reaction mixture is heated at substantially atmospheric pressure to a temperature at which refluxing of the solvent occurs. The reaction mixture is maintained under these conditions until the reaction between the thiosulfenyl halide and the amine to form the thiosulfenamide is substantially complete. The resulting mixture is then allowed to separate into an organic layer and an aqueous layer. The product thiosulfenamide is in the organic layer which is separated from the aqueous layer and treated in any suitable manner to recover the thiosulfenamide therefrom.

The following examples are illustrative of our invention.

Example I

Tertiary-butyl thiosulfenyl chloride was prepared by dissolving one mol of ditertiary butyl disulfide in 1600 ml of isopentane, cooling to −40° C. and passing a stream of dry chlorine into the well stirred solution until an equivalent amount (one mol) had been added. Loss of unreacted chlorine was substantially reduced by venting the reactor through a condenser cooled by Dry Ice. An inert nitrogen atmosphere was maintained. The mixture was stirred vigorously during the addition of the chlorine and for one hour thereafter. After formation of the thiosulfenyl chloride was completed, the solution was added to one mol of diethyl amine and 250 ml. of a 20 per cent aqueous solution of sodium hydroxide with stirring. The temperature of the reaction was essentially that of refluxing isopentane (28° C.) After one hour of refluxing the reaction mixture was removed from the reactor and the organic layer was separated from the aqueous layer. Isopentane was removed by distillation and the product was distilled in vacuo. A yield of 80 per cent of theoretical of N,N-diethyl-tert.-butylthiosulfenamide was obtained based on the amount of disulfide originally charged. The product had a boiling point of 60–63° C. at 0.5 mm. mercury pressure and a refractive index $n_D^{20}$ of 1.4995.

*Example II*

A run was made according to the procedure of Example I except that one mol of piperidine was reacted with the solution of tertiary butylthiosulfenyl chloride in isopentane. After one hour of refluxing the reaction mixture was removed from the reactor and the organic layer was separated from the aqueous layer. Isopentane was removed by distillation and the product was distilled in vacuo. A yield of 75 per cent of theoretical of tertiary-butylthiosulfenyl piperidine was obtained based on the amount of disulfide charged. The product had a boiling point of 90° C. at 0.5 mm. mercury pressure and a refractive index $n_D^{20}$ of 1.5300.

*Example III*

A run was made according to the procedure of Example I except that one mol of morpholine was reacted with the solution of tertiary-butylthiosulfenyl chloride in isopentane. After one hour of refluxing the reaction mixture was removed from the reactor and the organic layer was separated from the aqueous layer. Isopentane was removed by distillation and the product was distilled in vacuo. A yield of 85 per cent of theoretical of tertiary-butylthiosulfenyl morpholine was obtained based on the amount of disulfide originally charged. The product had a boiling point of 90° C. at 0.5 mm. mercury pressure and a refractive index $n_D^{20}$ of 1.5280.

From the above disclosure and examples modifications within the scope of our invention will be apparent to those skilled in the art.

We claim:

1. The process of synthesizing a thiosulfenamide which comprises contacting a tertiary alkyl thiosulfenyl halide in an inert organic solvent that forms a separate phase in the reaction mixture with an amine selected from the group consisting of primary and secondary amines in the presence of an aqueous solution of an alkaline material in an intimate admixture of solvent phase and aqueous phase and thereby effecting reaction between said thiosulfenyl halide and said amine to form a thiosulfenamide.

2. A process according to claim 1 wherein a molar ratio of thiosulfenyl halide to amine within the range of 0.75:1 to 1.25:1 is employed.

3. A process according to claim 1 wherein equimolar proportions of sulfenyl halide, amine and alkaline material are employed.

4. A process according to claim 1 wherein the alkaline material is an alkali metal hydroxide having a concentration within the range of 10 to 30 per cent by weight and wherein said alkali metal hydroxide is present in an amount sufficient to neutralize all of the hydrogen halide formed during the reaction whereby the thiosulfenamide is prepared free of amine hydrohalide.

5. A process according to claim 1 wherein the thiosulfenyl halide is added to the solution containing the amine.

6. The process according to claim 1 wherein the reaction temperature is maintained within the range of −20 to 65° C.

7. The process of synthesizing an alkyl thiosulfenamide which comprises commingling in an intimate admixture a solution of a tertiary alkyl thiosulfenyl chloride in an organic solvent which is inert in the reaction and which forms a separate phase in the reaction mixture and which boils between 25 and 50° C. with an amine selected from the group consisting of primary and secondary amines, the molar ratio of said thiosulfenyl chloride to said amine ranging from 0.75:1 to 1.25:1, and with an aqueous solution of an alkaline material in an amount sufficient to neutralize all of the hydrogen chloride liberated during the reaction between said thiosulfenyl chloride and said amine, heating the resulting reaction mixture at atmospheric pressure to a temperature at which refluxing of said solvent occurs, and recovering a tertiary alkyl thiosulfenamide from the thus produced reaction mixture.

8. The process according to claim 7 wherein said tertiary alkyl thiosulfenyl chloride contains no more than 20 carbon atoms per molecule.

9. The process according to claim 7 wherein said alkyl tertiary thiosulfenyl chloride contains no more than 12 carbon atoms per molecule and wherein said tertiary alkyl thiosulfenyl chloride contains only carbon and hydrogen atoms in addition to sulfur and chlorine atoms.

10. The process of synthesizing tertiary butyl thiosulfenyl piperidine which comprises commingling in an intimate admixture a solution of tertiary butyl thiosulfenyl chloride in isopentane with piperidine in an amount stoichiometrically equivalent to the amount of said thiosulfenyl chloride and with an aqueous solution of sodium hydroxide in an amount such that said sodium hydroxide is present in a quantity sufficient to combine with all of the hydrogen chloride liberated during the reaction between said thiosulfenyl chloride and said amine, holding the resulting reaction mixture at atmospheric pressure and at a temperature at which said isopentane is refluxed for one hour, separating the resulting reaction mixture into an isopentane layer and an aqueous layer, separating said isopentane layer and recovering therefrom tertiary butyl thiosulfenyl piperidine.

CHESTER M. HIMEL.
LEE O. EDMONDS.

REFERENCES CITED

The following references are of record in the file of this patent:

UNITED STATES PATENTS

| Number | Name | Date |
|---|---|---|
| 2,045,888 | Tschunkur et al. | June 30, 1936 |
| 2,123,082 | Schulze | July 5, 1938 |
| 2,271,834 | Carr | Feb. 3, 1942 |
| 2,417,954 | Sloan | Mar. 25, 1947 |
| 2,439,734 | Himel et al. | Apr. 13, 1948 |
| 2,476,655 | Fox et al. | July 19, 1949 |

FOREIGN PATENTS

| Number | Country | Date |
|---|---|---|
| 564,659 | Great Britain | Oct. 6, 1944 |